Patented Feb. 27, 1934

1,948,585

UNITED STATES PATENT OFFICE

1,948,585

PROCESS OF PURIFYING NORMALLY SOLID CHEMICAL COMPOUNDS

Stephen Józsa, New York, N. Y., assignor to Standard Brands Incorporated, Dover, Del., a corporation of Delaware No Drawing. Application October 24, 1929
Serial No. 402,303

5 Claims. (Cl. 260—122)

This invention relates to methods of purification of normally solid organic or inorganic chemical compounds, and, more particularly, to a method of purification in which impurities may be removed from such substances without resorting to the usual methods of purification such as repeated recrystallization.

A general object of the invention is to provide a method of purifying such materials in a convenient, efficient and economical manner.

A more particular object of the invention is to provide such a method in which the material and the impurities carried by the normally solid chemical compounds are first dissolved in a suitable solvent, and the solution is injected in dispersed condition into a solvent in which the solute to be purified is insoluble, but in which the impurities are soluble and the first mentioned solvent is either totally soluble or readily miscible.

The invention accordingly comprises the several steps and the relation and order of one or more of such steps with respect to each of the others thereof, which will be exemplified in the method hereinafter disclosed, and the scope of the application of which will be indicated in the claims.

Heretofore in the purification of crystallizable organic and inorganic substances, it has commonly been the practice to carry out the final stages of the purification by means of repeated recrystallization of the product to be purified from a suitable solvent.

In accordance with the principles of the present invention, it is found possible quickly and efficiently to purify such substances by first dissolving the material and the impurities carried thereby in a suitable solvent, and then injecting the solution in a more or less finely divided condition into a second substance in which the material to be purified is insoluble, the impurities are soluble and the first mentioned solvent is either soluble or readily miscible, so that the normally solid substance is obtained in a non-agglomerated condition and is of high purity.

A preferred method of dispersing the first-mentioned solution in the second-mentioned solvent is to spread it therethrough or thereon in the form of a spray. It is also found to be desirable to agitate the second solvent during the mixing operation in order that agglomeration of the precipitated material to be purified may be avoided.

While in the employment of the principles of the present invention concentration of the first-mentioned solution may be varied considerably, the proportion of the solute to the solvent should preferably be high in order to give a high concentration of the solute when it strikes the second-mentioned solvent, and to avoid emulsification of the mixtures.

As will be readily understood by one skilled in the art, the improved process may be used for the purification of a large variety of substances, and will include the use of solvents in each case appropriate to the material to be purified and the impurities to be removed.

As a specific example of the manner of applying the invention, the purification of stearic acid from water soluble impurities may be considered. If a 5% alcohol solution of impure stearic acid is prepared and sprayed into water at room temperature, the stearic acid will be precipitated in the water in a finely dispersed condition and will be entirely free from soap and inorganic impurities originally carried thereby, which latter pass into solution in the water. The precipitate may then be skimmed off and dried in a vacuum at a temperature of 40° C.

An important feature of the employment of the present invention is that the purified material, as for example, stearic acid mentioned in the specific example above, will usually have a volume substantially greater than that obtained by the precipitation or crystallization thereof by heretofore known methods. The materials prepared in accordance with the present invention are, due to their large surface area, more readily soluble than the same compounds heretofore known.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A process of separating normally solid chemical compounds from impurities carried thereby, which comprises dissolving the impure material in a solvent; adding the solution to a second solvent in which the solute to be purified is insoluble and from which it precipitates, in which the impurities are soluble, and with which the first mentioned solvent is readily miscible; and removing the precipitate of said solute from the second solvent; the mixing of the first mentioned solution into the second solvent being carried out by injection in a finely divided condition so that agglomeration of the said solute is substantially avoided.

2. A process of separating normally solid chemical compounds from impurities carried thereby, which comprises dissolving the impure material in a solvent; spraying the solution on a second solvent in which the solute to be purified is insoluble and from which it precipitates, in which the impurities are soluble, and with which the first mentioned solvent is readily miscible; and removing the precipitate of said solute from the second solvent.

3. A process of separating normally solid chemical compounds from impurities carried thereby, which comprises dissolving the impure material in a solvent; spraying the solution on a second solvent in which the solute to be purified is insoluble and from which it precipitates, in which the impurities are soluble, and with which the first mentioned solvent is readily miscible; removing the precipitate of said solute from the second solvent; and during the spraying operation agitating the second solvent in order to prevent agglomeratiin of said solute.

4. The method of purifying stearic acid from water soluble impurities which comprises preparing an alcohol solution containing about 5% of impure stearic acid and injecting said solution in a finely divided condition into water, and thereafter skimming off the precipitate of stearic acid and drying in a vacuum.

5. The method of purifying stearic acid from water soluble impurities which comprises preparing an alcohol solution containing about 5% of impure stearic acid and injecting said solution in a finely divided condition into water while agitating the water, and thereafter skimming off a precipitate of stearic acid and drying in a vacuum.

STEPHEN JÓZSA.